(12) United States Patent
Powell

(10) Patent No.: US 8,278,864 B2
(45) Date of Patent: Oct. 2, 2012

(54) COMPRESSOR CONTROL

(75) Inventor: Geoffrey George Powell, Oxfordshire (GB)

(73) Assignee: Gardner Denver Deutschland GmbH, Bad Neustadt (DE)

( * ) Notice: Subject to any disclaimer, the term of this patent is extended or adjusted under 35 U.S.C. 154(b) by 422 days.

(21) Appl. No.: 12/672,802

(22) PCT Filed: Aug. 7, 2008

(86) PCT No.: PCT/GB2008/002679
§ 371 (c)(1),
(2), (4) Date: Feb. 9, 2010

(87) PCT Pub. No.: WO2009/027623
PCT Pub. Date: Mar. 5, 2009

(65) Prior Publication Data
US 2011/0043156 A1   Feb. 24, 2011

(30) Foreign Application Priority Data
Aug. 29, 2007 (GB) .................................. 0716789.3

(51) Int. Cl.
*H02P 1/04* (2006.01)
(52) U.S. Cl. .................... 318/471; 318/400.08; 318/472; 318/481; 318/634; 700/29; 700/99; 417/12; 417/14; 417/38
(58) Field of Classification Search ............. 318/400.08, 318/471, 472, 481, 634; 417/12, 14, 38; 700/29, 99
See application file for complete search history.

(56) References Cited

U.S. PATENT DOCUMENTS
| | | |
|---|---|---|
| 4,405,290 A | 9/1983 | Rannenberg .................. 417/282 |
| 5,284,026 A | 2/1994 | Powell ........................... 62/209 |

(Continued)

FOREIGN PATENT DOCUMENTS
EP   1 555 438 A2   1/2005

OTHER PUBLICATIONS
Notification of Transmittal of the International Search Report and the Written Opinion of the International Searching Authority, in connection with PCT/GB2008/002679, dated Nov. 12, 2008.

*Primary Examiner* — Paul Ip
(74) *Attorney, Agent, or Firm* — James B. Conte; Husch Blackwell LLP

(57) ABSTRACT

The invention relates to improvements in compressors and, in particular, to an improvement in a method of controlling variable speed dynamic compressors to avoid 'motor overload as a result of choking.1 The invention therefore comprises a method of controlling a compressor to provide compressed gas at a target delivery pressure (Pt) and prevent excessive motor power consumption, the compressor being driven by a variable speed motor which has motor windings, wherein the gas inlet temperature (Tin), gas output delivery pressure (Pd), motor speed (Vm) and the motor winding temperature (Tmw) are continuously measured during operation of the compressor. The gas inlet temperature (Tin) is used to determine a predetermined maximum motor winding temperature (Tmwmax) limit. The maximum motor winding temperature (Tmwmax) is used (to set a maximum motor speed (Vmmax) limit. The maximum motor speed (Vmmax), target (Pt) and gas output delivery (Pd) pressures are used to control the actual motor speed (Vm) below the maximum motor speed limit (Vmmax).

4 Claims, 3 Drawing Sheets

U.S. PATENT DOCUMENTS

| | | | |
|---|---|---|---|
| 6,390,779 B1 * | 5/2002 | Cunkelman | 417/14 |
| 7,641,449 B2 * | 1/2010 | Iimura et al. | 417/12 |
| 2004/0265134 A1 * | 12/2004 | Iimura et al. | 417/38 |
| 2009/0119036 A1 * | 5/2009 | Jayanth et al. | 702/60 |
| 2009/0204234 A1 * | 8/2009 | Sustaeta et al. | 700/29 |
| 2009/0204245 A1 * | 8/2009 | Sustaeta et al. | 700/99 |
| 2010/0111709 A1 * | 5/2010 | Jayanth | 417/44.11 |

* cited by examiner

COMPRESSOR CONTROL

CROSS-REFERENCE TO RELATED APPLICATION

This Application is a Section 371 National Stage Application of International Application No. PCT/GB2008/002679, filed Aug. 7, 2008, published as WO 2009/027623, in English, the content of which is hereby incorporated by reference in its entirety.

The invention relates to improvements in compressors and, in particular, to an improvement in a method of controlling variable speed dynamic compressors to avoid motor overload as a result of choking.

Variable speed dynamic compressors, such as centrifugal compressors, have been used to compress air, or other gases, since the 1960s. Centrifugal compressors, which comprise a cylindrical assembly of compressor blades mounted to an axis, are used in a wide variety of fields for a number of reasons. They are generally energy efficient, are low maintenance as they have few moving parts, and they usually give a higher air flow than a similarly sized reciprocating compressor.

The operating characteristics of a compressor are generally defined by the relationship between the pressure ratio and volume or mass flow rate. However, its useful operational range is limited by surge, choke and the maximum permissible compressor speed.

In variable speed dynamic compressors operating at a given delivery pressure, the air flow rate through the compressor can be increased by increasing the speed of the compressor. A choke condition is encountered at high flows, when an increase in compressor speed gives a diminishing increase in the rate of flow. When the flow at any point in the compressor reaches the choke condition, no further flow rate increase is possible. This condition represents the maximum compressor volumetric flow rate as a function of the pressure ratio. Compressor designers have attempted to find ways of preventing choking during compressor operation to maximise compressor efficiency.

The inlet temperature of the air (or other gas being compressed) determines how much power is required to compress the air to a given pressure ratio, as it may take more power to compress a given volume of cold, denser air than it does warm, less dense air. Thus the power output of a compressor drive is a function of its speed and torque, the torque being a function of the compressor delivery pressure and air inlet temperature.

An increase in the speed of the motor driving the compressor necessitates an increase in motor power, which leads to an associated increase in the motor winding temperature. One of the problems encountered in trying to protect compressors from choking and to avoid excessively high motor winding temperatures, is that it is difficult to measure power directly. One prior art approach is therefore to run the compressor within fixed speed and power limits. Intervention is necessary in the event of a breach of these limits and ultimate protection is provided by stopping the machine when the limits are reached. This is clearly not acceptable, however, for normal commercial compressor operation.

It is therefore an object of the present invention to provide a method of controlling the power by using the measurement of other parameters as a means for preventing choke by avoiding motor overload.

The invention therefore provides a method of controlling a compressor to provide compressed gas at a target delivery pressure and prevent excessive motor power consumption, the compressor being driven by a variable speed motor which has motor windings, wherein;

gas inlet temperature, gas output delivery pressure, motor speed and the motor winding temperature are continuously measured during operation of the compressor;

the gas inlet temperature is used to determine a predetermined maximum motor winding temperature limit;

the maximum motor winding temperature is used to set a maximum motor speed limit; and the maximum motor speed, target and gas output delivery pressures are used to control the actual motor speed below the maximum motor speed limit.

A preferred embodiment of the present invention will now be described, by way of example only, with reference to the accompanying drawings in which:—

In the present invention a dynamic compressor, such as a centrifugal compressor, is driven by a variable speed motor, and its operation is controlled by a control unit. A human machine interface (HMI) is provided to enable certain parameters to be preset.

The purpose of a compressor is to supply air (or other gas) at a given delivery pressure $P_d$ at a rate that matches the demand for air. To achieve this the speed of the compressor, and therefore its output flow, is varied. To protect the compressor, certain maximum limits are set on the winding temperature, power and speed of the drive motor. The maximum speed $V_{mmax}$ is that which keeps the compressor operating within its preset limits and the minimum speed $V_{mmin}$ is used when the compressor reaches surge point, and the compressor is off-loaded to reduce the delivery pressure $P_d$. It should be noted that these values are given as a working example for one particular compressor and motor combination. These will of course vary from compressor to compressor and motor to motor.

Figure 1:
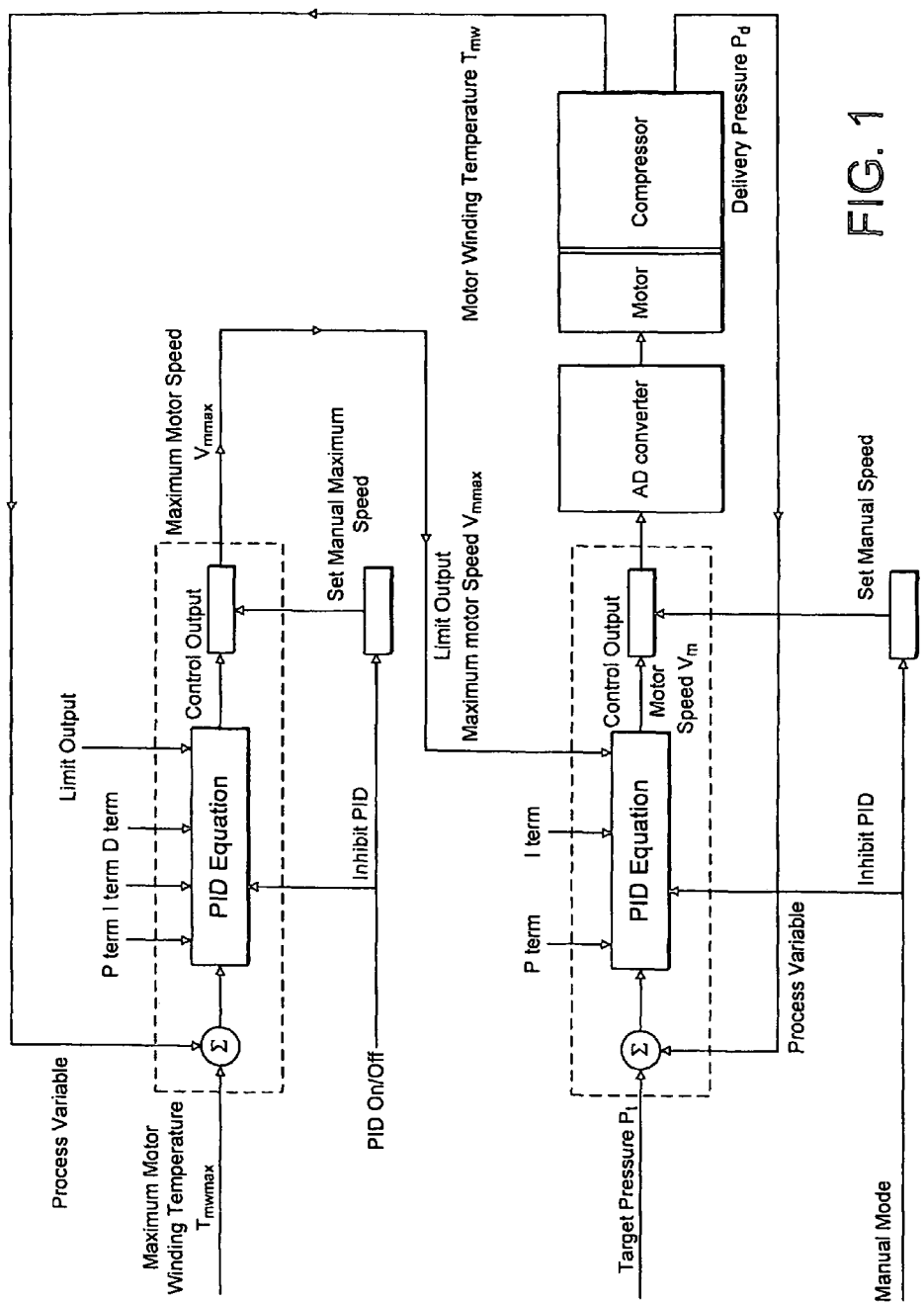
FIG. 1 is a diagrammatic representation of a double PID loop used by the control unit of the present invention to control the operation of the compressor.

In the present invention, the control unit is programmed to use a double proportional-integral-derivative (PID) loop as shown in FIG. 1, the individual loops of which are described below.

Pressure Control

The first PID loop uses the measured delivery pressure $P_d$ as its control input and motor speed $V_m$ as its control output. This PID loop is represented in the lower Section of FIG. 1. The P and I terms (the D term not actually being required) are set at the HMI and the measured delivery pressure $P_d$ is the process variable which is compared with the target (desired) pressure $P_t$ (also set at the HMI). If the delivery pressure $P_d$ exceeds the target pressure $P_t$, the motor speed $V_m$ is reduced according to the PID equation. If the delivery pressure $P_d$ drops below the target pressure $P_t$ the motor speed $V_m$ is increased up to the maximum motor speed $V_{mmax}$.

Maximum Speed Control

The measured motor winding temperature $T_{mw}$ is used as the control input (process variable) in the second PID loop to adjust the maximum speed limit $V_{mmax}$ of the motor (the control output) and thereby keep the motor winding temperature $T_{mw}$ within the preset limits. This second loop is represented in the upper section of FIG. 1. The P, I and D terms are also set at the HMI and the measured motor winding temperature $T_{mw}$ is the process variable which is compared with the maximum motor winding temperature $T_{mwmax}$. This allows the maximum possible motor speed $V_{mmax}$ to maintain the required delivery pressure $P_d$.

Maximum Power Control

As stated previously, the motor power $W_m$ required to meet a particular demand situation depends on the inlet air temperature $T_{in}$. As the maximum motor winding temperature $T_{mwmax}$ is also a function of the air inlet temperature $T_{in}$ the motor power $W_m$ can be controlled using the motor winding temperature $T_{mw}$.

Figure 2:
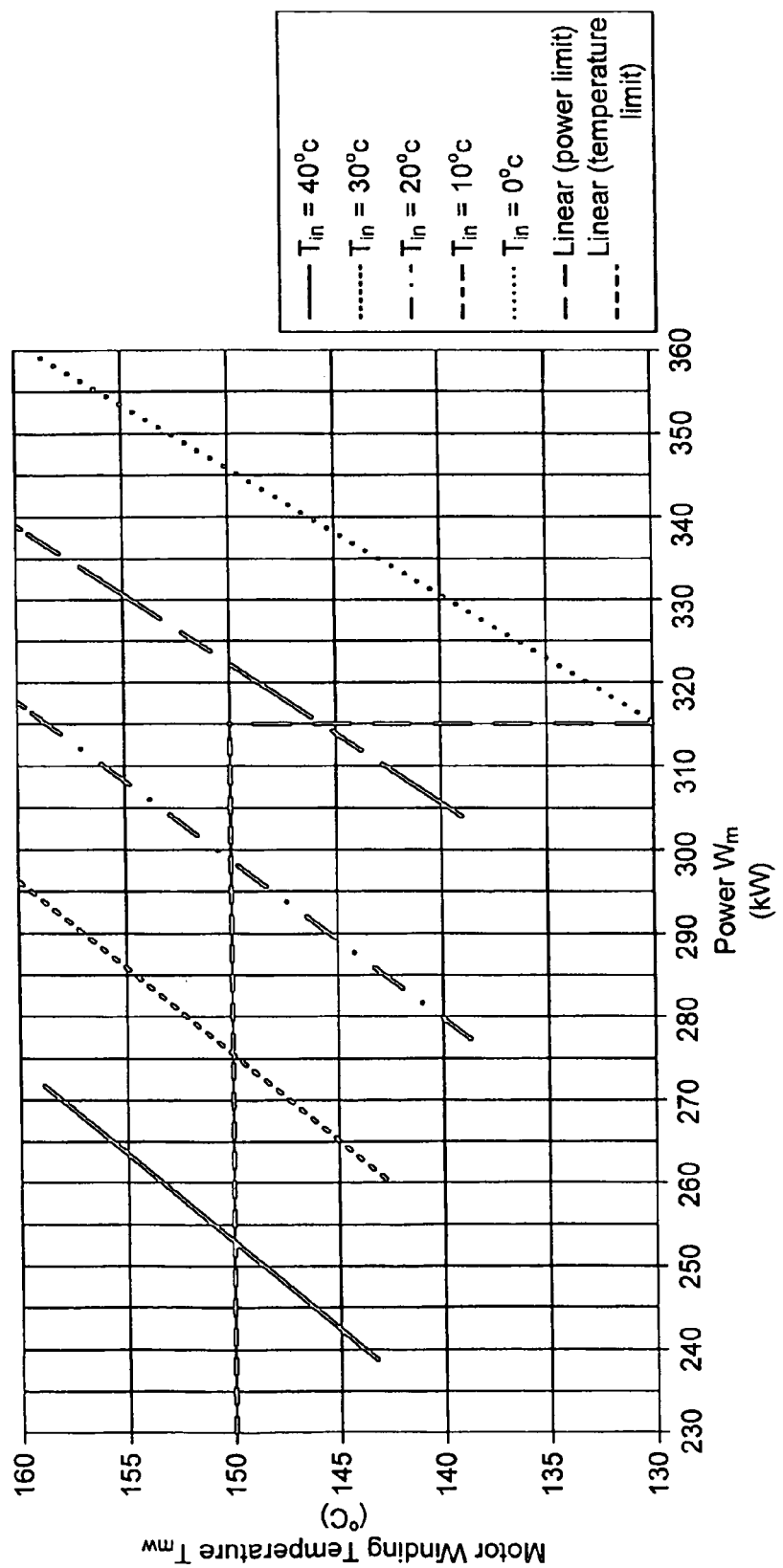
FIG. 2 is a graph showing motor winding temperature/power for different inlet air temperatures.

In the present invention the maximum motor winding temperature $T_{mwmax}$ for any inlet temperature $T_{in}$ is derived from a proof of concept (POC) unit and is used to plot the graph of FIG. 2 using steady state measurements at various pressures and temperature conditions. For a given air inlet temperature $T_{in}$ this graph shows that there is a linear relationship between the motor power $W_m$ and motor winding temperature $T_{mw}$. Furthermore, the power $W_m$ required decreases linearly with air inlet temperature $T_{in}$.

There are also two fixed limits shown on FIG. 2. These are defined by the physical design of the machine and are the Design maximum motor winding Temperature $T_{mwdes}$ and the Design maximum motor Power $W_{mdes}$.

Figure 3:
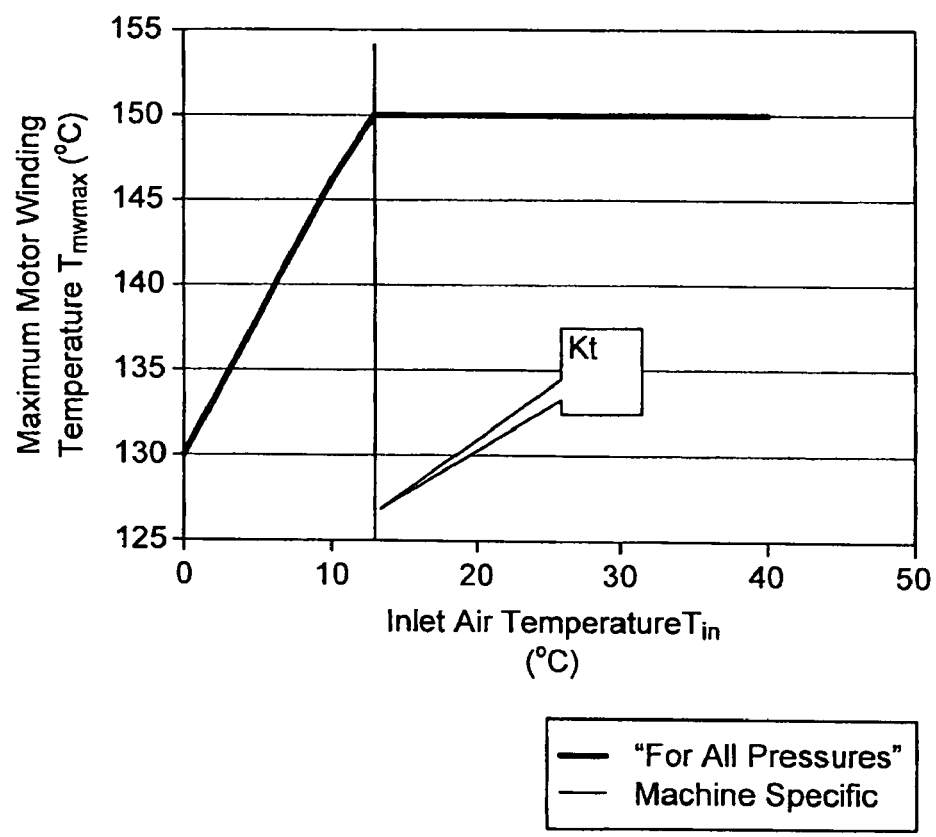
FIG. 3 is a graph showing motor winding temperature/air inlet temperature.

The graph of FIG. 2 is used to plot the curve of FIG. 3 by plotting mT vs $T_{in}$ at the maximum design power $W_{mdes}$. At Inlet temperatures above the intersection of the maximum design temperature and power, the maximum temperature mT is limited by the max design temperature $T_{mwdes}$ and the inlet temperature $T_{in}$ has no influence. Thus the value of the maximum winding temperature $T_{mwmax}$ may be calculated for $T_{in}$ below $K_t$ from the following formula:—

$$T_{mwmax} = m \cdot T_{in} + c$$

where m is the slope of the curve and is dependant on the air inlet temperature $T_{in}$ and c is a constant dependant on the intersection of max design temperature and the inlet temperature $K_t$ in FIGS. 2.

$$m = (T_{mwdes} - T_{mw0°C})/k_t = (150-130)/13 = 1.548 \text{ (for this example)}$$

$$c = T_{mw0°C} = 130 \text{ (for this example)}$$

It can be noted from FIG. 3 that, to keep within the preset limits, above $K_t$ (13° C.) it is the winding temperature $T_{mw}$ that is the limiting parameter, whilst below $K_t$ (13° C.) it is the power $W_m$ which is the limiting parameter. However, given the near linear nature of the curves and given the $T_{mw}/W_m$ cross over temperature $K_t$ (13° C.) it can be seen that the maximum motor winding temperature $T_{mwmax}$ at low temperatures can be reduced proportionally to the air inlet temperature $T_{in}$, whilst still maintaining an absolute maximum at other temperatures. Thus:—

$$\text{If } T_{in} < K_t, \ T_{mwmax} = m \cdot T_{in} + T_{mw0°C} \text{ else}$$
$$T_{mwmax} = T_{setmax}$$

The invention is thus based on the principle that a reduction in the maximum winding temperature $T_{mwmax}$ will cause a reduction in maximum speed $V_{mmax}$ resulting in a reduction to the actual speed of the motor $V_m$ and therefore control the actual winding temperature $T_{mw}$ which has the effect of controlling the power $W_m$. Hence the PID control loops are combined, as shown in FIG. 1, to provide the overall control of the motor power $W_m$ which enables the operator to prevent choking. The first loop controls the speed of the motor and therefore the compressor speed $V_m$, up to the maximum speed limit $V_{max}$ calculated by the second loop. The measured motor winding temperature $T_{MW}$ is fed into the second loop, which compares it with the calculated maximum motor winding temperature $T_{mwmax}$ based on the measured inlet temperature $T_{in}$ to provide the maximum working speed $V_{max}$ which is fed back to the first loop.

The method of the present invention is based on steady state measurements and cannot be applied in run up conditions. However, if the power limitation is primarily to control motor winding temperature or choke condition, this would not be a problem. If there is another limitation due to acceleration, not covered by the VFD variable frequency drive current limit, then the ramp up time would need to be adjusted in the variable frequency drive.

The invention claimed is:

1. A method of controlling a compressor to provide compressed gas at a target delivery pressure and prevent excessive motor power consumption, the compressor being driven by a variable speed motor which has motor windings, wherein;
    gas inlet temperature, gas output delivery pressure, motor speed and the motor winding temperature are continuously measured during operation of the compressor;
    the gas inlet temperature is used to determine a predetermined maximum motor winding temperature limit;
    the maximum motor winding temperature is used to set a maximum motor speed limit; and
    the maximum motor speed, target and gas output delivery pressures are used to control the actual motor speed below the maximum motor speed limit.

2. A method as claimed in claim 1 in which a double PID loop is used to determine the maximum motor speed limit.

3. A method as claimed in claim 2 in which the gas output delivery pressure is fed as a control input to a first loop of the double PID loop, the control output of which is the motor speed.

4. A method as claimed in claim 2 in which the measured motor winding temperature is fed to the second loop of the double PID loop as a control input, the control output of which is the maximum motor speed.

* * * * *